United States Patent
Chiapasco

(10) Patent No.: US 10,208,871 B2
(45) Date of Patent: Feb. 19, 2019

(54) BISTABLE ELECTRIC VALVE, PARTICULARLY FOR A SYSTEM FOR RECOVERY OF PETROL VAPOURS IN A MOTOR-VEHICLE

(71) Applicant: BITRON S.p.A., Turin (IT)

(72) Inventor: Davide Chiapasco, Fossano (IT)

(73) Assignee: Bitron S.p.A., Turin (IT)

( * ) Notice: Subject to any disclaimer, the term of this patent is extended or adjusted under 35 U.S.C. 154(b) by 0 days.

(21) Appl. No.: 15/552,001

(22) PCT Filed: Feb. 17, 2016

(86) PCT No.: PCT/IB2016/050837
§ 371 (c)(1),
(2) Date: Aug. 18, 2017

(87) PCT Pub. No.: WO2016/132298
PCT Pub. Date: Aug. 25, 2016

(65) Prior Publication Data
US 2018/0245708 A1   Aug. 30, 2018

(30) Foreign Application Priority Data
Feb. 19, 2015  (IT) .............. TO2015A0111

(51) Int. Cl.
*F16K 31/08* (2006.01)
*F02M 26/53* (2016.01)
*F02M 25/08* (2006.01)

(52) U.S. Cl.
CPC .......... *F16K 31/082* (2013.01); *F02M 26/53* (2016.02); *F02M 2025/0845* (2013.01)

(58) Field of Classification Search
CPC ................. F16K 31/082; F02M 26/53; F02M 2025/0845
See application file for complete search history.

(56) References Cited

U.S. PATENT DOCUMENTS

| 4,253,493 A * | 3/1981 | English ............... F01L 9/04 137/625.18 |
| 4,403,765 A * | 9/1983 | Fisher ............... F16K 31/082 137/625.65 |

(Continued)

FOREIGN PATENT DOCUMENTS

| EP | 0 225 016 A1 | 6/1987 |
| EP | 0 340 625 A1 | 11/1989 |

(Continued)

OTHER PUBLICATIONS

International Search Report for PCT/IB2016/050837, dated Apr. 21, 2016 (PCT/ISA/210).

(Continued)

*Primary Examiner* — Eric Keasel
(74) *Attorney, Agent, or Firm* — Thedford I. Hitaffer; Hitaffer & Hitaffer, PLLC

(57) ABSTRACT

A bistable electric valve for a system that recovers petrol vapors in a motor vehicle. The electric valve includes a hollow housing (2) in which there is defined a chamber (5) with respective first and second openings (4a, 3a) between which a valve seat (6) is defined; an obturator (7) movable inside said chamber (5) and adapted to cooperate with the valve seat (6) for controlling a fluid flow between the openings (4a, 3a); a ferromagnetic core (17) mounted movably inside the housing (2) and connected to the obturator (7); first and second permanent magnets (11, 12) mounted in the housing (2) and adapted to keep the ferromagnetic core (17) in first and second working positions, respectively, in which the associated obturator (7) closes and opens the valve seat (6), respectively; and a control solenoid (9) adapted to generate a magnetic flux for attracting the core (17) towards either one of the said first and second working positions. The obturator (7) is displaceable with respect to (Continued)

the core (17), from and towards the valve seat (6), and the obturator (7) has an associated spring (30) tending to urge it towards the seat (6).

9 Claims, 5 Drawing Sheets

(56) References Cited

U.S. PATENT DOCUMENTS

| | | |
|---|---|---|
| 5,029,807 A | 7/1991 | Fuchs |
| 8,240,636 B2 * | 8/2012 | Smith .................. F16K 31/082 |
| | | 137/554 |
| 2017/0067572 A1 | 3/2017 | Rovera |

FOREIGN PATENT DOCUMENTS

| | | |
|---|---|---|
| EP | 0 717 220 A1 | 6/1996 |
| WO | 02/068850 A1 | 9/2002 |

OTHER PUBLICATIONS

Written Opinion of the International Searching Authority for PCT/IB2016/050837, dated Apr. 21, 2016 (PCT/ISA/237).

* cited by examiner

BISTABLE ELECTRIC VALVE, PARTICULARLY FOR A SYSTEM FOR RECOVERY OF PETROL VAPOURS IN A MOTOR-VEHICLE

BACKGROUND OF THE INVENTION

Field of the Invention

The present invention relates to a bistable electric valve, in particularly for a system for recovery of petrol vapours in a motor-vehicle.

More specifically the invention relates to a bistable electric valve of the type comprising
- a hollow housing in which there is defined a chamber having first and second openings between which a valve seat is defined;
- an obturator movable inside said chamber and adapted to cooperate with said valve seat for controlling a flow of fluid between said openings;
- a ferromagnetic core mounted movably inside said housing and connected to the obturator;
- first and second permanent magnets mounted in the housing and adapted to keep the ferromagnetic core in first and second working positions, respectively, in which the associated obturator closes and opens the valve seat, respectively; and
- a control solenoid arranged around the displacement path of said ferromagnetic core and adapted to generate a magnetic flux capable of causing the attraction of said core towards either one of said first and second working positions.

Background

A bistable electric valve of this type is described and illustrated in the Italian patent application TO2014A000224 in the name of the same Applicant.

Such prior bistable electric valve functions excellently, but is somewhat complex and costly to manufacture. Said valve in fact comprises a plurality of lug-like extensions, a main obturator movable inside the chamber defined in the valve body, as well as an auxiliary obturator mounted movably in the region situated between the main obturator and one of the openings in the body of the electric valve. A further permanent magnet is rigidly connected to the auxiliary obturator. Moreover, a further opposition spring is associated with this auxiliary obturator.

SUMMARY OF THE INVENTION

One object of the present invention is therefore to provide a bistable electric valve which is simple and inexpensive to produce.

This object, and other objects, are achieved according to the invention with a bistable electric valve of the type specified above, characterized primarily in that
- the obturator is displaceable with respect to the ferromagnetic core, from and towards the valve seat, and said obturator has associated resilient means tending to urge it towards said seat;
- the arrangement being such that when the ferromagnetic core is in the aforementioned first position, the resilient means keep the obturator against the valve seat, allowing the obturator to move away from the seat when the upstream fluid pressure of said seat exceeds a predetermined value.

BRIEF DESCRIPTION OF THE INVENTION

Further characteristic features and advantages of the invention will become clear from the following description provided purely by way of a non-limiting example, with reference to the accompanying drawings in which.

DETAILED DESCRIPTION OF THE INVENTION

Figure 1:
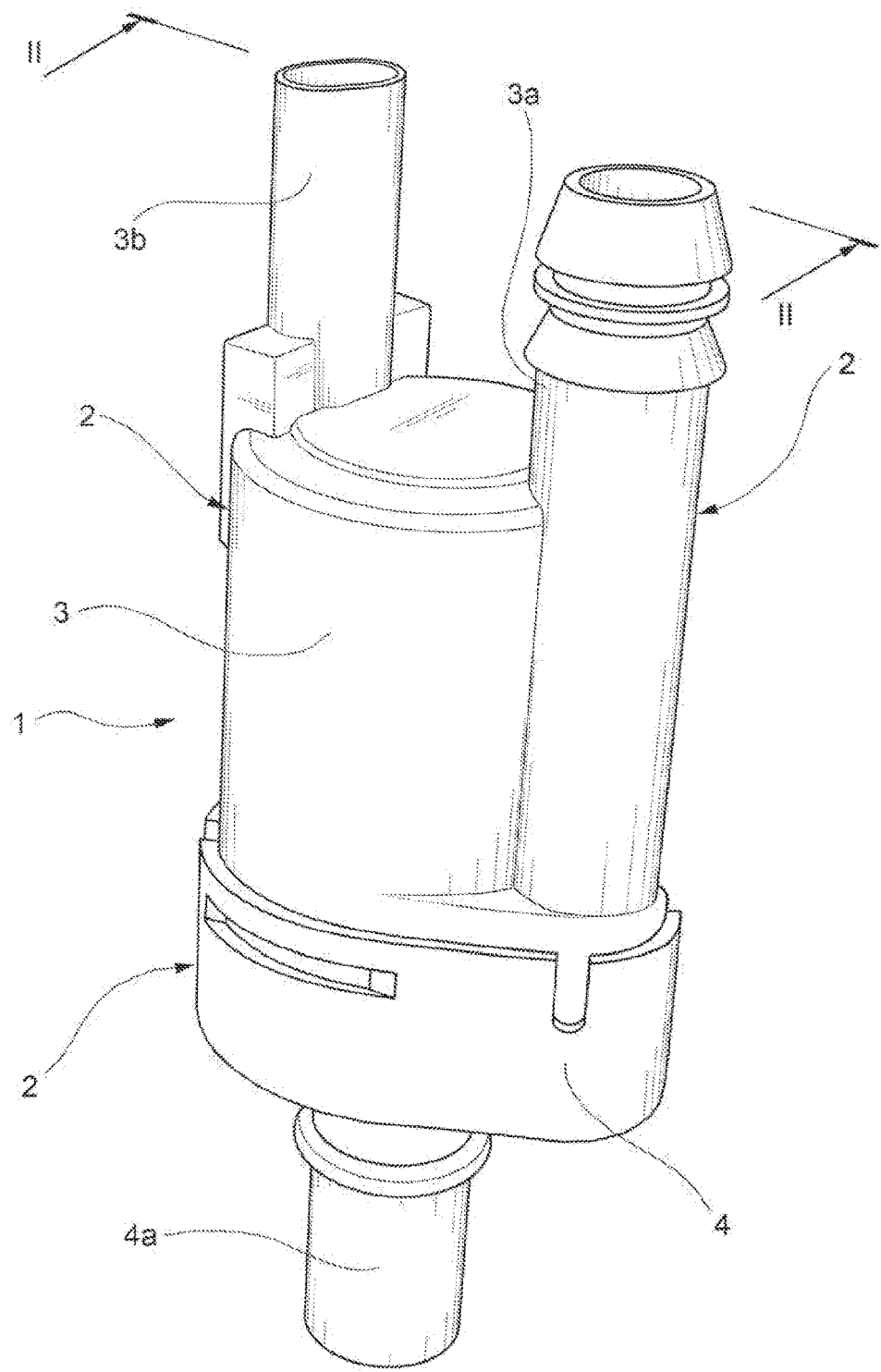
FIG. 1 is a perspective view of a bistable electric valve according to the present invention.

The reference number 1 denotes in its entirety a bistable electric valve according to the present invention, intended particularly for use in a system for recovery of petrol vapours in a motor-vehicle.

The electric valve 1 comprises a hollow support housing, denoted overall by 2, comprising a top part 3 and a bottom part 4 fixed together by means of snap-engaging connection members of the type known per se.

The top part 3 of the body 2 in the embodiment shown forms two tubular lugs 3a and 3b which are essentially parallel to each other and directed upwards when viewing FIGS. 1 to 4.

The bottom part 4 of the body 2 forms a tubular lug 4a directed downwards when viewing the aforementioned figures.

The tubular lugs 4a and 3a of the body 2 define an inlet passage or opening and, respectively, an outlet passage or opening for a fluid flow which passes through the electric valve 1 during operation.

Figure 2:
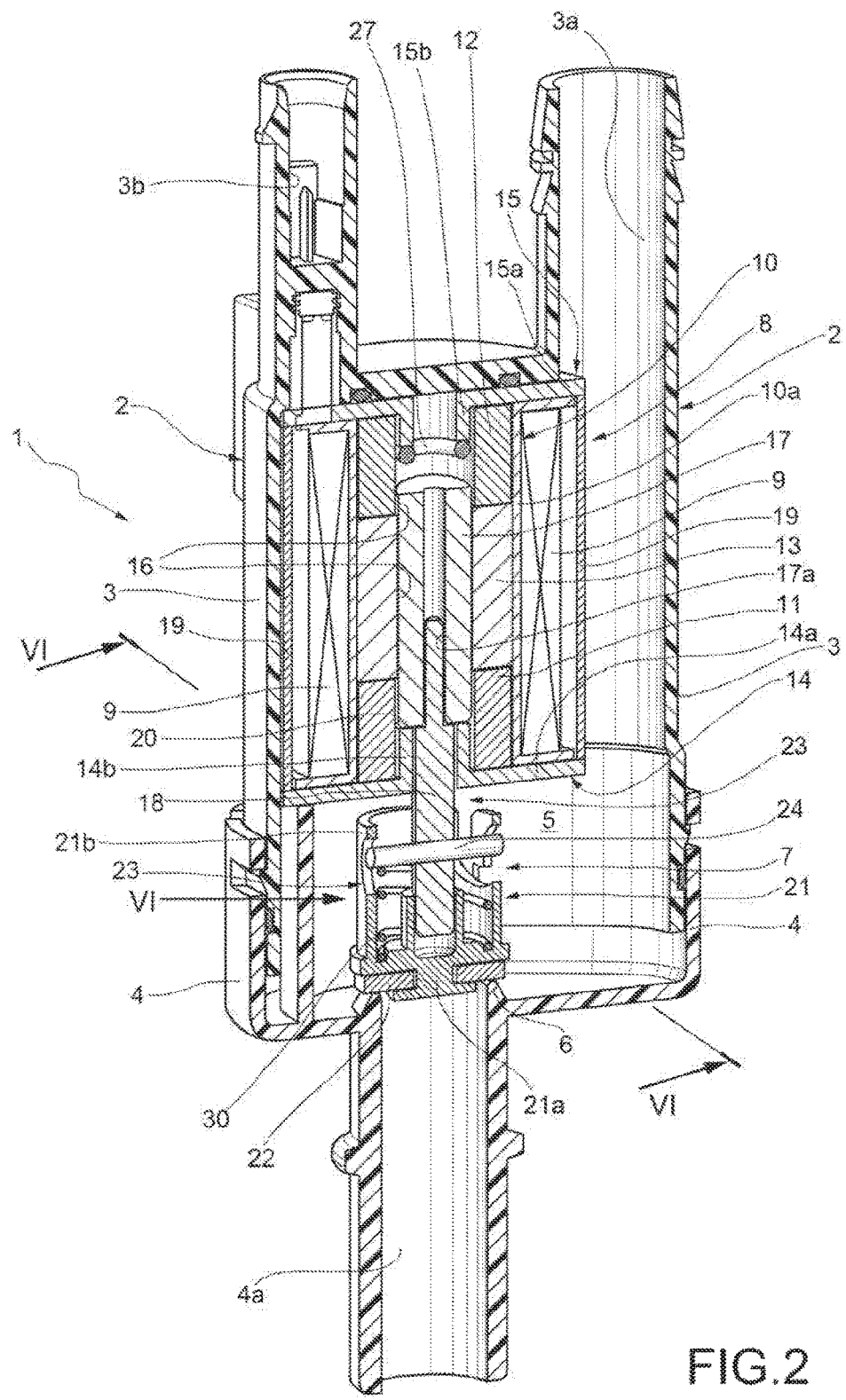
FIG. 2 is a cross-sectional view along the line II-II of FIG. 1.
Figure 3:
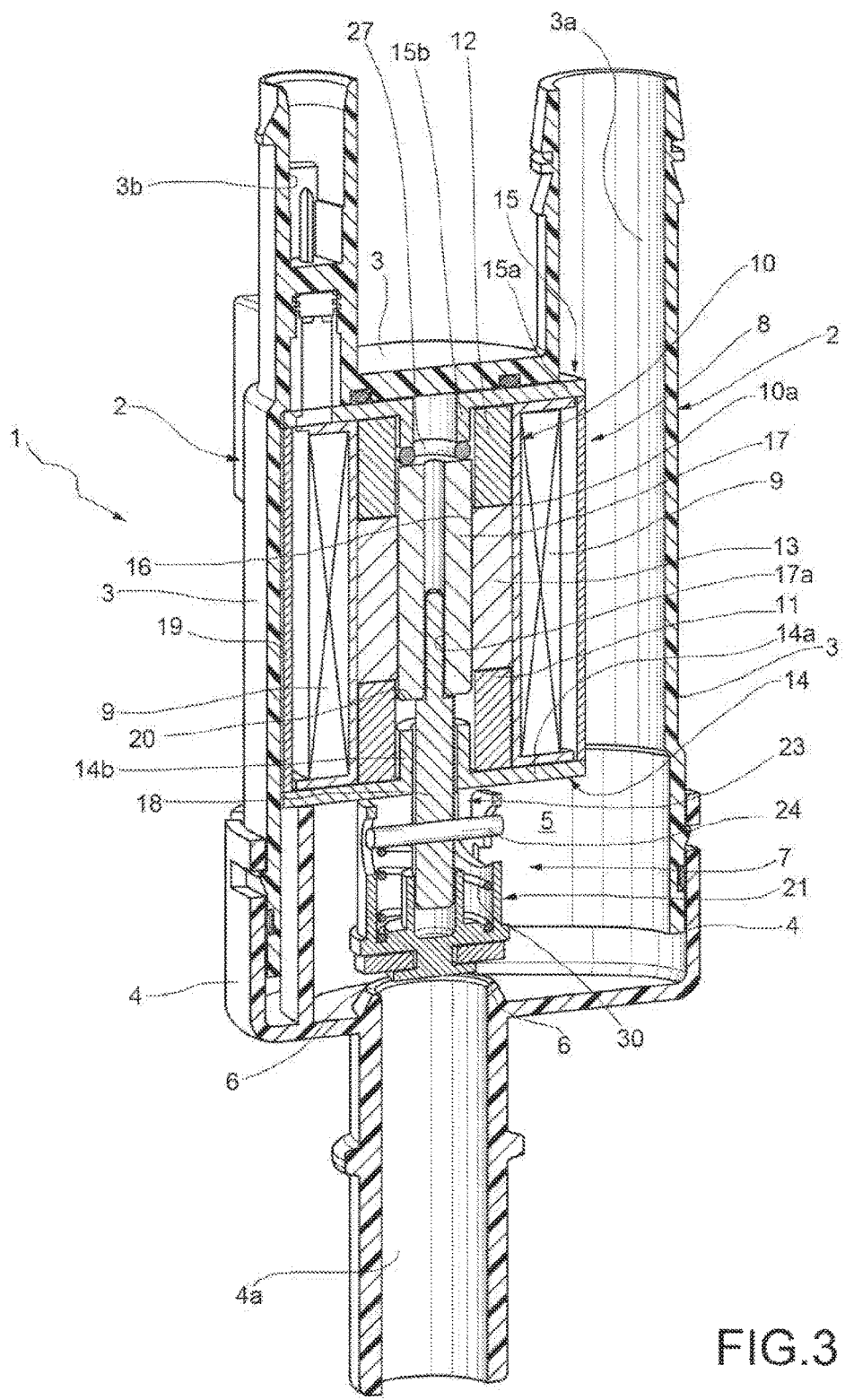
FIG. 3 is a view similar to that shown in FIG. 2 and shows another operative condition of the bistable electric valve.
Figure 4:
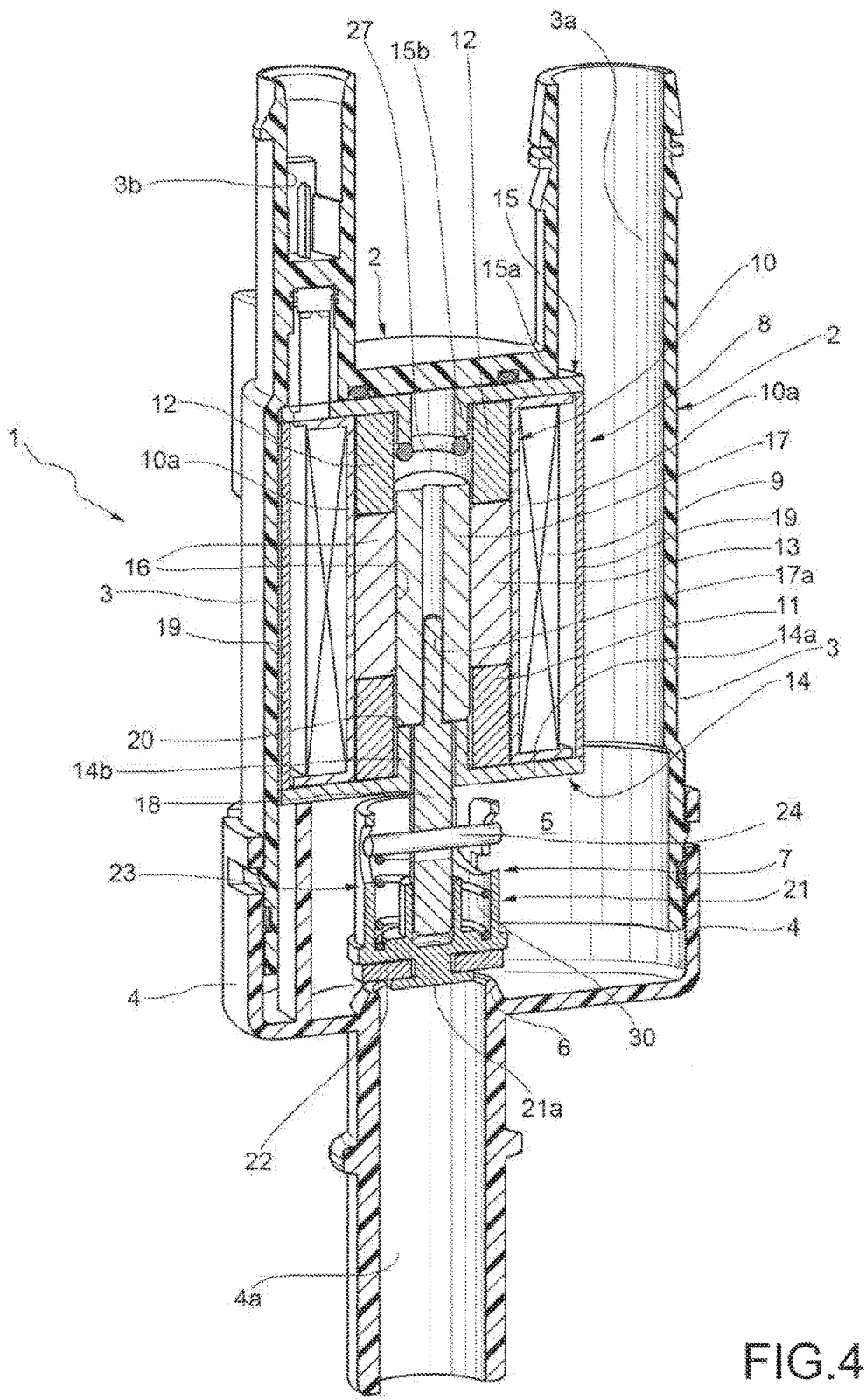
FIG. 4 is a view similar to the views shown in FIGS. 2 and 3 and shows a further operative condition of the bistable electric valve.

A chamber 5 is defined inside the body 2, between the tubular lugs 3a and 4a (FIGS. 2 to 4), in which a valve seat 6 is formed at the proximal end of the tubular formation 4a (see in particular FIGS. 3 and 4).

The chamber 5 in the embodiment shown communicates permanently with the outlet passage 3a and is capable of being placed in communication with the inlet passage 4a via the valve seat 6.

A movable obturator unit, denoted overall by 7 in FIGS. 2 and 4, is associated with the valve seat 6.

As will appear more clearly below, the position of the obturator unit 7 relative to the valve seat 6 is controlled by an actuating assembly 8 seated inside the housing 2 of the electric valve.

In the embodiment shown, the actuating assembly 8 comprises a control solenoid 9 mounted on a reel 10, for example made of moulded plastic.

The reel 10 has a central axial portion 10a, which is essentially tubular and which has, fixed to its ends, a first and a second permanent magnet denoted by 11 and 12 in FIGS. 2 and 4. These magnets have a substantially annular form and are aligned essentially along the axis of the valve seat 6 which coincides with the axis of the control solenoid 9.

A spacer member 13 made of non-magnetic material, which also has an annular/tubular form, is arranged between the magnets 11 and 12 inside the central tubular portion 10a of the reel 10.

Respective ferromagnetic members 14 and 15 are coupled with the opposite ends of the reel 10 and each of them comprises a respective transverse head portion 14a and 15a which extends close to a corresponding end of the control solenoid 9.

The ferromagnetic end members 14 and 15 also have a respective tubular axial portion 14b and 15b which extends inside the associated permanent magnet 11 and 12.

An essentially cylindrical axial passage 16 is defined between the portions 14b and 15b of the ferromagnetic members 14 and 15, on the inside of the magnets 11 and 12 and the spacer 13, and has a ferromagnetic core 17 mounted axially displaceably inside it.

In the embodiment shown, the core 17 has a cylindrical tubular shape and has an axial hole 17a inside which one end of an essentially rod-shaped non-magnetic member 18 is fixed, said member protruding outside the core 17 in the direction of the obturator unit 7, passing through and beyond the tubular portion 14b of the bottom ferromagnetic member 14. 19 in FIGS. 2 to 4 denotes a tubular cylindrical element of ferromagnetic material which surrounds the control solenoid 9 and the ends of which extend close to the transverse portions 14a and 15a of the ferromagnetic members 14 and 15.

Together the ferromagnetic members 14, 15 and 19 form a magnetic circuit inside which most of the magnetic flux generated by the control solenoid 9, when energized, is localized.

The distal ends of the portions 14b and 15b of the ferromagnetic end members 14 and 15 face the ends of the ferromagnetic core 17.

A spacing ring 20 made of non-magnetic material with a calibrated thickness is arranged between the bottom end of the ferromagnetic core 17 and a transverse shoulder of the member or stem 18. This spacer member 20 has the function of defining in a precise manner the length in the axial direction of the air-gap which is formed between the core 17 and the bottom ferromagnetic member 14 when the electric valve 1 is in the operating condition shown in FIG. 2 or in the operating condition shown in FIG. 4 (these conditions will be described in greater detail below).

As an alternative to the solution shown by way of example in FIGS. 2 and 4, the non-magnetic spacing ring 20 could be fixed stably at the top end of the tubular portion 14b of the bottom ferromagnetic member 14.

A preferably annular, resilient, damping element 27 is applied to the tubular portion 15b of the ferromagnetic member 15 on the side facing the movable core 17.

Figure 6:
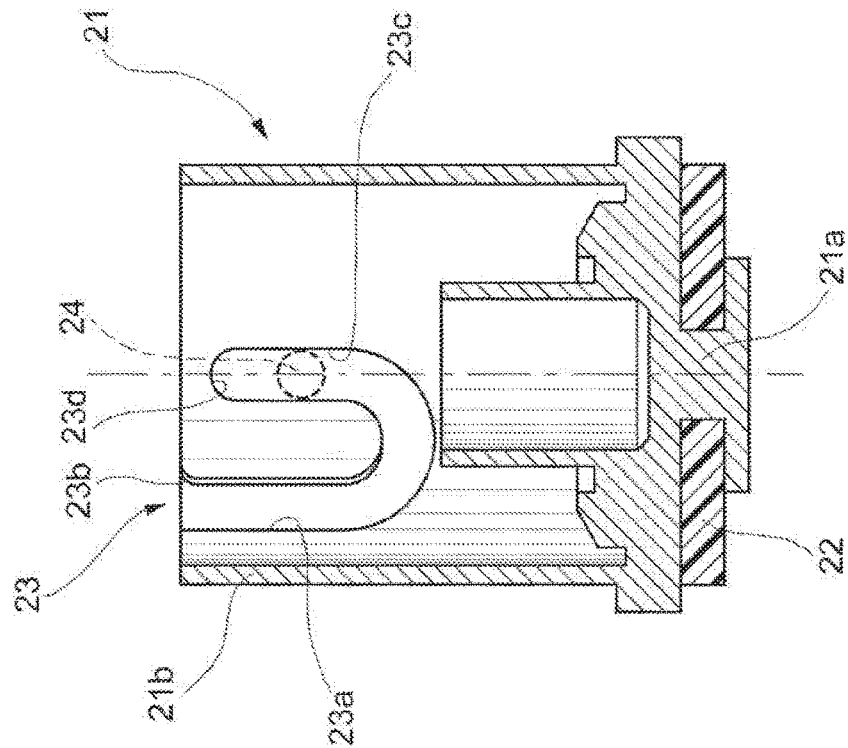
FIG. 6 is a view of the obturator unit cross-sectioned along the line VI-VI of FIG. 2.
Figure 5:
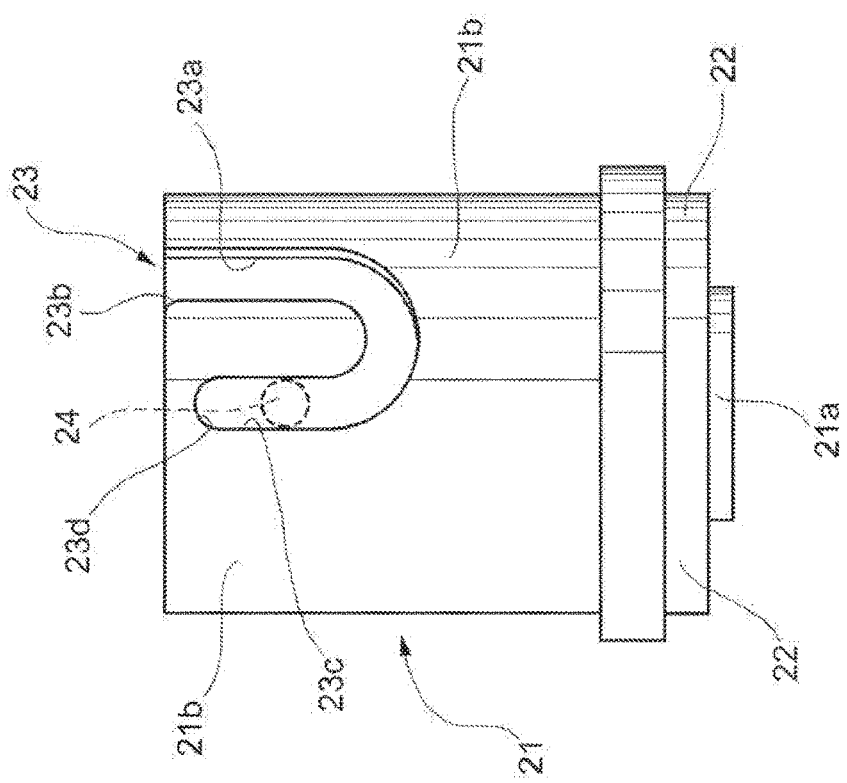
FIG. 5 is a perspective view, along the arrow V of FIG. 2, of an obturator unit comprised in the bistable electric valve according to the preceding figures.

In the embodiment shown, the obturator unit 7 comprises an essentially cup-shaped body 21 with a bottom stem 21a which has, arranged around it, a seal 22, for example made of elastomer material and acting as the actual obturator, intended to cooperate with the valve seat 6 (see also FIGS. 5 and 6).

The body 21 has an essentially annular cylindrical top part 21b, transversely opposite portions of which are provided with two slits 23 which are preferably asymmetrical with respect to the axis of said body.

The slits 23 in the body 21 define an introduction and coupling path for the opposite ends of a pin or stem 24 transversely fixed inside the portion of the non-magnetic member 18 which extends outside and below the actuator device 8.

With reference in particular to FIGS. 5 and 6, each path defined by a slit 23 has an essentially U-shaped form, with a first branch 23a having an open top introduction end 23b and a second branch 23c having a closed top retaining end 23d.

The transversely projecting ends of the pin 24 are, during assembly, engaged or introduced through the top openings 23a of the slits 23 and then slid until they reach the branches 23c of these slits.

A helical spring 30 is arranged between the transverse stem 24 and the bottom wall of the upper portion 21b of the body 21 of the obturator unit 7.

The obturator unit 7 can therefore be displaced, relative to the ferromagnetic core 17 and the non-magnetic member 18, towards and away from the valve seat 6 and the spring 30 tends to urge this obturator unit 7 towards said seat.

The arrangement described above is such that the ferromagnetic core 17 and the associated non-magnetic element 18 are able to assume first and second working positions shown, respectively, in FIGS. 2 and 3, where the associated obturator device 7 closes and opens, respectively, the valve seat 6, so as to allow a flow of fluid, such as a flow of petrol vapours, from the inlet opening 4a to the outlet opening 3a of the electric valve 1.

The condition shown in FIG. 2 is a stable condition: the ferromagnetic core 17 is attracted by the permanent magnet 11 and remains in this position until the control solenoid 9 is de-energized.

Conveniently, in this condition the end of the core 17 facing the obturator 7 extends substantially in the axially intermediate transverse plane of the permanent magnet 11.

In the condition shown in FIG. 2, the obturator 7 closes the valve 6, while the ends of the stem 24 extend inside an intermediate portion of the branch 23c of the slits 23 in the body 21.

If, in this condition, the control solenoid 9 is energized so as to cause the passage, inside the ferromagnetic core 17, of a flow tending to displace it upwards when viewing FIG. 2, the assembly formed by this core 17 and the associated non-magnetic element 18 are displaced initially away from the valve seat 6 without however moving, along with it, the body 21 of the obturator unit 7, so that the seal 22 continues to close the valve seat 6.

As soon as energization of the control solenoid 9 causes the ends of the transverse stem 24 of the non-magnetic element 18 to engage with the closed ends 23d of the associated slits 23 in the body 21, the latter is also made to move away from the valve seat 6. The electric valve 1 therefore passes into the open condition.

During this displacement, the spring 30 exerts a thrust on the pin 24 and therefore on the non-magnetic element 18 and on the core 17, in the direction of the magnet 12, cooperating in this way with the solenoid 9 so as to cause opening of the electric valve 1.

In this condition, shown in FIG. 3, the ferromagnetic core 17 presses at the top against the annular damping element 21 and is retained in the position shown in this figure owing to the attraction exerted thereon now by the permanent magnet 12 which prevails over the force of attraction exerted by the bottom magnet 11, owing to the smaller air-gap which separates the top end of the core 17 from the top ferromagnetic member 15.

The condition shown in FIG. 3 is maintained also after de-energization of the control solenoid 9. This condition is therefore also a stable operating condition.

Conveniently, in the condition shown in FIG. 3, the top end of the core 17 extends substantially in the axially intermediate transverse plane of the magnet 12.

In order to cause the electric valve 1 to switch back into the closed condition, the control solenoid 9 must be energized with a current flow which is the reverse of that required for the prior switching operation.

Renewed energization of the control solenoid 9 has the effect that the magnetic flux induced in the core 17, together with the force of attraction exerted on this core by the bottom magnet 11, prevails over the force of attraction exerted on said core by the top magnet 12.

Therefore, the assembly formed by the movable core 17, the non-magnetic element 18 and the obturator device 7 assumes again the condition shown in FIG. 2 and remains stably there also after de-energization of the control solenoid 9.

With reference to FIG. 4, if, while the electric valve 1 is in the closed condition with the non-energized solenoid 9, the pressure of the fluid at the inlet 4a exceeds a predetermined threshold value, this fluid is capable of causing raising of the body 21 and the seal 22 away from the valve seat 6: this displacement, which does not involve the core 17 and the non-magnetic element 18, allows "venting" of the excess pressure from the inlet 4a to the chamber 5 and towards the outlet 3a. Once the incoming overpressure has been vented, the body 21 of the obturator device 7 returns into the closed condition shown in FIG. 2, under the action of the spring 30.

The bistable electric valve according to the present invention offers the advantage of a significant structural simplicity, with the result that it may be manufactured in a decidedly low-cost manner.

The magnetic circuit of the actuating device 8 is in particular optimized, so that the strength of the current needed to excite the control solenoid 9 and cause the switching of the electric valve is relatively low.

Obviously, without altering the principle of the invention, the embodiments and the constructional details may be greatly varied with respect to that described and illustrated purely by way of a non-limiting example, without thereby departing from the scope of the invention as defined in the accompanying claims.

The invention claimed is:

1. A bistable electric valve (1) for a system for recovery of petrol vapors in a motor-vehicle, comprising:
   a hollow housing (2) in which there is defined a chamber (5) having respective first and second openings (4a, 3a) between which a valve seat (6) is defined;
   an obturator (7) movable inside said chamber (5) and adapted to cooperate with said valve seat (6) for controlling a flow of fluid between said openings (4a, 3a);
   a ferromagnetic core (17) mounted movably inside the housing (2) and connected to the obturator (7);
   first and second permanent magnets (11, 12) mounted in the housing (2) and adapted to keep the ferromagnetic core (17) in first and second working positions, respectively, in which the associated obturator (7) closes and opens the valve seat (6), respectively; and
   a control solenoid (9) arranged around a displacement path of the ferromagnetic core (17) and adapted to generate a magnetic flux capable of causing attraction of said ferromagnetic core (17) towards either one of said first and second working positions;
   the obturator (7) is displaceable with respect to the ferromagnetic core (17) from and towards the valve seat (6), and the obturator (7) has associated resilient means (30) tending to urge the obturator (7) towards said valve seat (6);
   an arrangement being such that when the ferromagnetic core (17) is in said first working position, said resilient means (30) keep the obturator (7) against the valve seat (6), allowing the obturator (7) to move away from said valve seat (6) when the fluid pressure upstream of said valve seat (6) exceeds a predetermined value; and
   when the control solenoid (9) is energized while the ferromagnetic core (17) is in the first working position and the obturator (7) closes the valve seat (6), said resilient means (30) cause an application onto said ferromagnetic core (17) of a force tending to displace the ferromagnetic core (17) towards the second working position, cooperating with the control solenoid (9) so as to determine opening of the electric valve (1),
   wherein the obturator (7) extends outside the control solenoid (9), between the ferromagnetic core (17) and the valve seat (6) and is mounted movably with respect to a non-magnetic member (18) which is rigidly connected to said ferromagnetic core (17) and which protrudes from one end of said ferromagnetic core (17) towards the valve seat (6), and
   wherein the control solenoid (9) is mounted on a reel (10) which has a central axial portion (10a) of tubular shape, having, arranged at ends thereof, said first and second permanent magnets (11, 12) which have an annular shape and define an axial passage (16) in which said ferromagnetic core (17) is axially displaceably mounted.

2. The bistable electric valve according to claim 1, wherein said resilient means (30) are arranged between the ferromagnetic core (17) and the obturator (7).

3. The bistable electric valve according to claim 1, wherein the ferromagnetic core (17) has an axial hole (17a) in which there is fixed one end of said non-magnetic member (18), the other end of said non-magnetic member (18) being coupled with the obturator (7) by said resilient means (30).

4. The bistable electric valve according to claim 3, wherein the obturator (7) comprises a body (21) of annular shape, transversely spaced portions of which are provided with slits (23) which are non-symmetrical with respect to the axis of said body (21) and are adapted to define an introduction and coupling path for corresponding transversely protruding formations (24) of said non-magnetic member (18); said path having a U shape, with a first branch (23a) having an open introduction end (23b) and with a second branch (23e) having a closed retaining end (23d); s aid protruding formations (24) being operationally engaged inside said second branches (23e) of the paths (23) defined by the slits (23) of said annular body (21).

5. The bistable electric valve according to claim 1, wherein the control solenoid (9) has an associated magnetic circuit including two ferromagnetic end members (14, 15), each of which comprises a transverse head portion (14a, 15a), which extends at a corresponding end of said solenoid (9), and a tubular axial portion (14b, 15b), which extends inside the axial passage (16) of the corresponding permanent magnet (11, 12), in an axially facing relationship with one end of the aforementioned ferromagnetic core (17).

6. The bistable electric valve according to claim 5, wherein a rigid, non-magnetic, spacer member (20) having a calibrated thickness is connected to the end of the ferromagnetic core (17) which faces the first permanent magnet (11).

7. The bistable electric valve according to claim 5, wherein a rigid, non-magnetic, spacer member (20) is applied to the tubular portion (14b) of the ferromagnetic end member (14) which is associated with the first permanent magnet (11).

8. The bistable electric valve according to claim 5, wherein a resilient damping member (27), which is annular, is applied to the tubular portion (15b) of the ferromagnetic end member (15) associated with the second permanent magnet (12).

9. The bistable electric valve according to claim 1, wherein the arrangement is such that
- when the ferromagnetic core (17) is in the first working position, an end of the ferromagnetic core (17) facing the obturator (7) extends in the axially intermediate transverse plane of the first permanent magnet (11); and
- when the ferromagnetic core (17) is in the second working position, an end of the ferromagnetic core (17) facing away from the obturator (7) extends in the axially intermediate, transverse plane of the second permanent magnet (12).

* * * * *